United States Patent [19]

Rothbart et al.

[11] 4,087,166

[45] May 2, 1978

[54] MICROFICHE ROLL REPRODUCER

[75] Inventors: Michael Rothbart, Tarzana; Tor H. Petterson, Rancho Palos Verdes, both of Calif.

[73] Assignee: Terminal Data Corporation, Woodland Hills, Calif.

[21] Appl. No.: 663,030

[22] Filed: Mar. 2, 1976

[51] Int. Cl.² ............... G03B 21/11; G03B 23/12
[52] U.S. Cl. .................................................. 353/26 A
[58] Field of Search ............ 353/25 R, 26 R, 26 A, 353/27 R, 27 A; 242/195; 250/570, 227

[56] References Cited

U.S. PATENT DOCUMENTS

| 3,190,575 | 6/1965 | Hayner et al. | 242/195 |
| 3,708,677 | 1/1973 | Volk et al. | 353/26 A |
| 3,743,400 | 7/1973 | Haning et al. | 253/26 A |
| 3,751,152 | 8/1973 | Rinehart | 353/26 A |
| 3,802,771 | 4/1974 | Mickelson | 353/26 A |
| 3,941,978 | 3/1976 | Huston et al. | 353/26 R |

Primary Examiner—Harry N. Haroian
Attorney, Agent, or Firm—Harry R. Lubcke

[57] ABSTRACT

A microfiche image reproducer for exhibiting any selected frame that is upon a roll of microfiches housed in a cartridge. Coded indicia unique to each frame are printed along one edge. Sensors control motors which reel the film out of or into the cartridge and arrange transverse motion thereof to allow any frame to be exhibited through a fixed optical system. Threading is automatic.

9 Claims, 8 Drawing Figures

4,087,166

MICROFICHE ROLL REPRODUCER

BACKGROUND OF THE INVENTION

This invention pertains to winding and reeling a web containing machine-convertible information and including a cartridge.

The prior art includes apparatus for winding a web to a desired longitudinal position. A code extends across the web and affects photo-sensors. One motor with a pair of clutches moves the web forward or backward.

Another arrangement employs a series of dots longitudinally disposed along the web and containing electrical means that controls the extent to which a motor operates, thus to arrive at a preselected longitudinal point along the web. The zero spot for counting may be at the center of the web, with plus or minus counting to move in opposite directions. Should the web stop with a sensor intercepting the middle of a dot, the ambiguity of counting two dots or no dots upon restarting is present.

Another arrangement employs a blocked code adjacent to the frame in a microfilm strip having a single row of frames, as in motion picture practice. An IBM type card has a group of holes in it corresponding to the code of the wanted frame. Illumination is directed through both card and the strip web. Coincidence in the holes arrangement thus removes all illumination from adjacently disposed sensors, or gives maximum illumination depending upon the choice of the locations of the opaque and transparent areas in the code.

Another arrangement employs a printed-circuit board. This is inserted into the machine and after a selection is made for a particular frame of a microfiche on a keyboard, the selected frame is displayed. The circuit board determines the format of how many frames per fiche. Thus, the chosen frame will be centered and fully reproduced.

Another arrangement employs fiche-like cards that have perforated-through coded indicia and are used with an xerographic machine. When the indicia corresponds to a selected one, that frame is printed out, while other cards pass through the machine without printing being accomplished.

SUMMARY OF THE INVENTION

Typically, a large number of microfiche are printed one-after-the-other on a roll of film and are then wound into a cartridge. Coded indicia are also printed along one edge of the roll and digitally identify each column.

Alternately, the many microfiche frames may be printed with uniform longitudinal spacing on the film, thereby eliminating the usual grouping into microfiche.

The roll cartridge is placed into the reproducer machine of this invention, and the code corresponding to a desired frame is entered into the electrical control logic of the machine. The machine then moves the roll both longitudinally and transversely until the selected frame is centered in an optical aperture for reproduction.

The longitudinally translating portion of the machine is mounted on a transversely moveable carriage. Transverse "Y" axis motion allows a selected row in the column of the microfiche to be selected for projection of the frame thereat by a stationary optical system.

The carriage carries a pair of motors exercising counter-torque to maintain the film web taut between the cartridge and the take-up spool. Photo sensor means read the transparent or opaque elements of the coded indicia.

Electronic logic, typically employing integrated circuits, controls the carriage position and the longitudinal translation of the film. The digital code is unique for each frame and this allows rapid translation of the film when it is considerably removed from the selected frame and slow translation when the film is close to it.

Automatic threading of the roll to the take-up spool is provided. The cartridge cannot be removed unless the film is reeled back into it, which is accomplished by pressing a button.

DESCRIPTION OF THE PREFERRED EMBODIMENT

Figure 1:
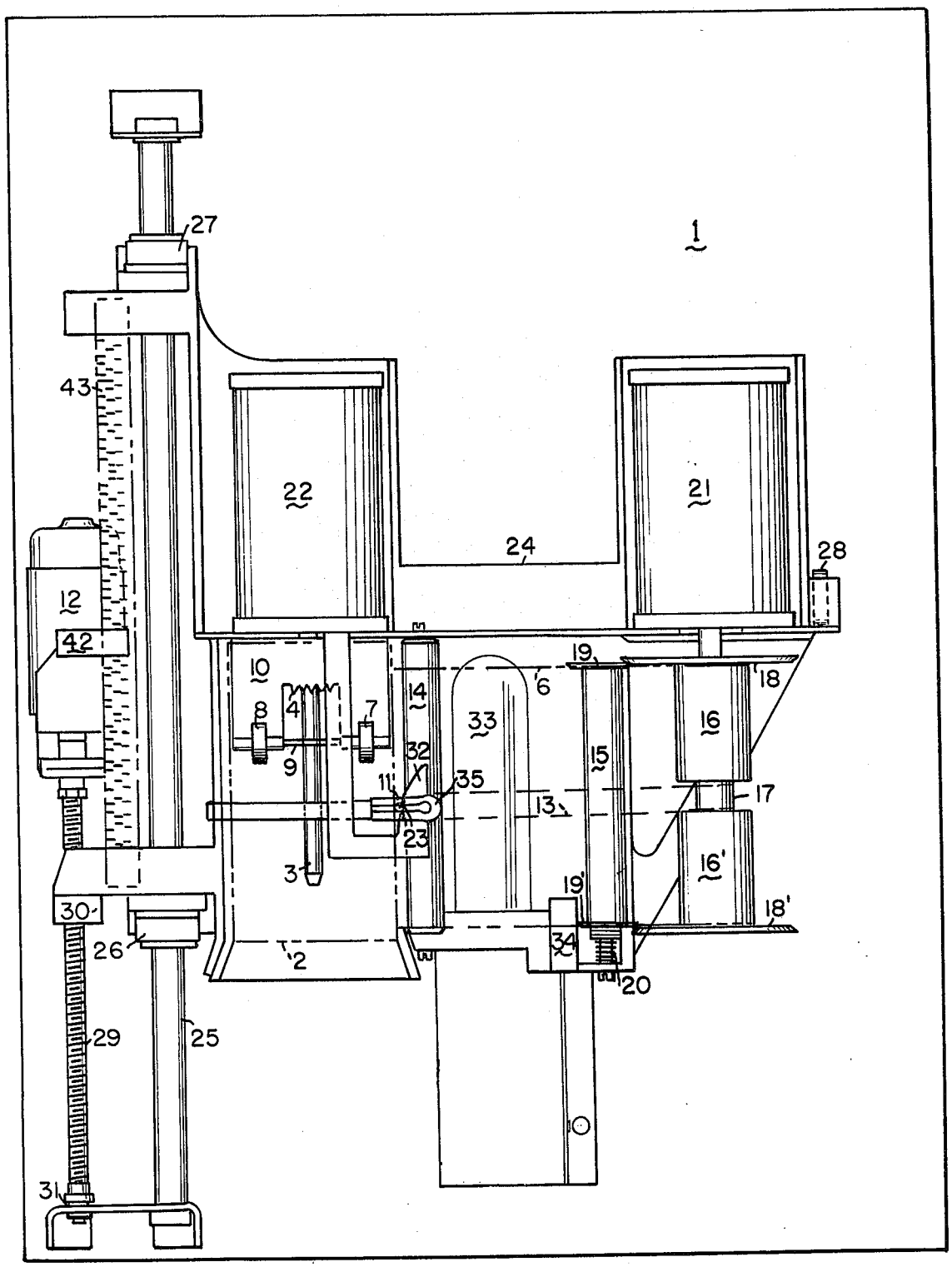
FIG. 1 shows a plan view of the reproducer machine mechanism.
Figure 2:
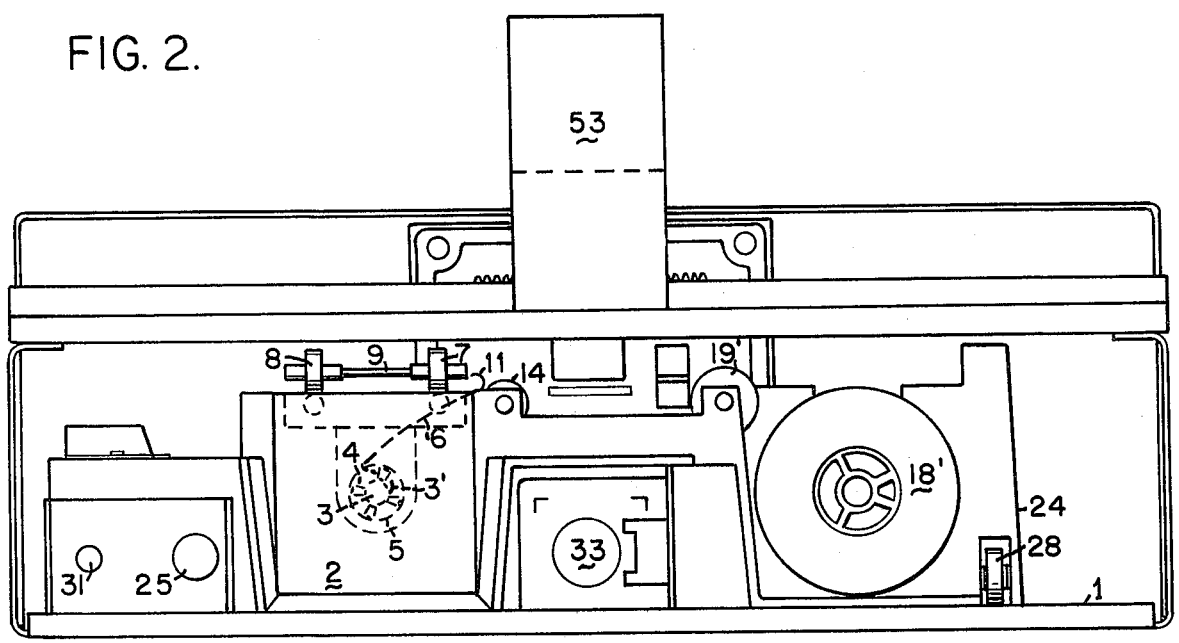
FIG. 2 shows a front elevation view of the same.

In FIG. 1, numeral 1 indicates a base plate, which provides a rigid support for the several mechanical elements of the microfiche roll reproducer. The microfiche are typically on 105 mm wide film that is contained in cartridge 2. This is shown in phantom in FIG. 1 and in full lines in FIG. 2.

The film is normally tightly wound within the cartridge by the rewind mode of this apparatus. This keeps foreign material from between the layers of film and prevents inter-layer abrasion from vibration, should the cartridge be transported in a vehicle subject to vibration.

Cartridge 2 slips upon shaft 3 when inserted into the reproducer apparatus. A four-position ratchet dog 4 is on the end of hollow roller 5 within the cartridge, upon which film 6 is wound. This dog is engaged by a single radial projection 3' upon shaft 3 when the cartridge if fully in position.

A pair of rollers 7 and 8 upon shaft 9 are spring loaded toward the cartridge by leaf spring 10. The rollers engage depressions in the cartridge and insures that the cartridge is fully inserted.

A leader upon the first part of film 6 has hook 11 at the free end. This is of metal, or metal-like plastic. The hook is engaged by means to automatically thread the film into the reproducer apparatus.

Suitable means comprise a flexible metal or elastic strap 13 that is permanently fastened to the small diameter portion 17 of the take-up reel and extends back to hook 11. This strap is positioned adjacent to the hook when the prior cartridge was rewound so that the cartridge could be removed from the machine.

A typically metal solid rivet 23 is permanently fastened at the free end of the strap and engages hook 11, thereby to pull the film from the newly installed cartridge, over the optical projection station, and upon take-up reel 16, 16'.

Rivet 23 is fastened to hook 11 by coation between scythe 32 and flexible tongue 35. Strap 13 lays upon scythe 32 after the prior cartridge is rewound. The curved free end of the scythe forces the rivet into the tongue and also under hook 11 upon the scythe being moved rearward by electronic logic to the position shown in FIG. 1.

Figure 6:
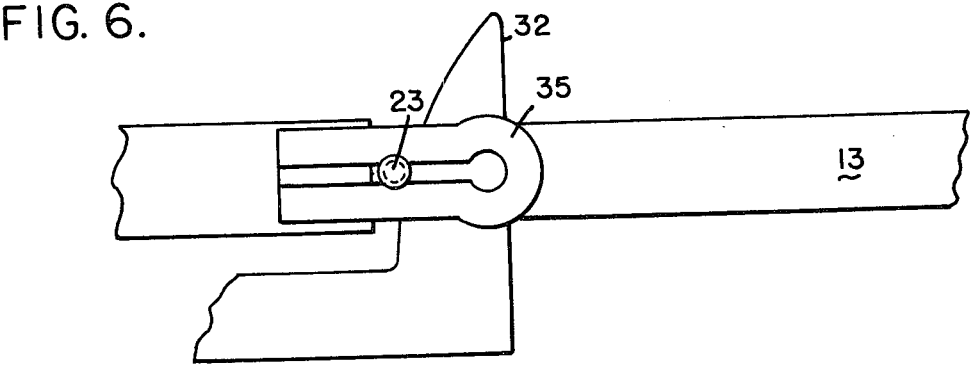
FIG. 6 is an enlarged top plan view of the automatic threading structure.
Figure 7:
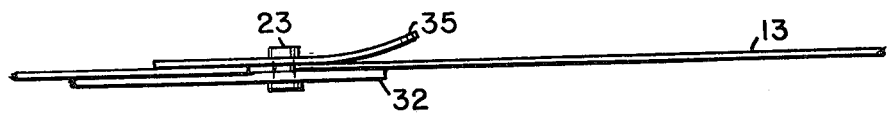
FIG. 7 is an enlarged side elevation view of the same structure.
Figure 8:
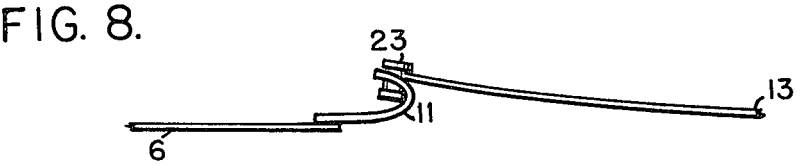
FIG. 8 is also an enlarged side elevation view of the principal elements in initial motion.

The above structure and mode of operation is shown in detail in FIGS. 6, 7 & 8.

FIG. 6 is a top plan view of the automatic threading structure after automatic threading has been accomplished.

FIG. 7 is a side elevation view of that structure. The relation of the elements is the initial relation, and at rest.

FIG. 8 is also a side elevtion view of the structure, but with initial motion taking place. The assembly moves off to the right.

When the "proceed to search" (for the selected fiche frame) control button is pressed, reel 16,16' revolves to wind the strap onto portion 17 and subsequently film 6 upon the reel. This continues until the code along the edge of the film matches the digital number that has been punched into the keyboard by an operator. Then the film stops and the selected frame is exhibited on a viewing screen.

Flanges 18 and 18' are provided at the ends of the take-up reel with a resiliently arranged 105 mm separation in order to keep the film in place laterally during the winding or unwinding process. Additionally, spring-loaded idler rollers may be included upon the periphery of the take-up reel to press down upon the edges of the film.

Roller 14 has a greater length than the width of film 6, say 10% greater. This allows a single element to determine the lateral placement of film 6. This is roller 15, with flanges 19 and 19'. The latter are closer together than any other such confining element. Helical spring 20 urges flange 19' to a fixed lateral position for film 6, toward the rear of the device; thereby to insure a consistent exhibition position of the fiche frame.

Preferred performance in translating and positioning film 6 is achieved herein by using two ideally identical electric motors 21 and 22.

Suitably electronically controlled, motor 21 pulls the long fiche film through the microfiche reproducer. Motor 22 provides retro-torque to insure a taut film at the exhibiting gate. It also accomplishes rewind of the film back into the cartridge, and if an address of a selected fiche frame is a lower number than where the roll of film happens to be from a prior address, then motor 22 provides the pull force and motor 21 the retro-torque.

Motor 21, with coacting reel 16, 18 constitutes a first means to move film 6, and motor 22, with coacting shaft 3, constitute a second means.

All of the elements previously recited, save base 1, are mounted on carriage 24. The carriage is supported for translation forward and back upon rod 25. This motion is transverse of the film 6 and thus allows a selected frame in a column to be exhibited upon projection screen 55 of FIG. 3.

Two bearings, 26 and 27, are positioned forward and back at the left of carriage 24, journaling rod 25. This gives precision restraint longitudinal of the microfiche film and precision freedom of movement transverse of the film. The right side of the carriage is supported by roller 28, which rides upon base plate 1.

Third motor 12, lead-screw 29 and follow-nut 30, constitute a third means arranged to move film 6 transversely. The motor is appropriately energized under logic control to rotate in one direction or the other in order to position film 6 for exhibition of the selected frame in a column of microfiche frames. The lead-screw and the follow-nut convert rotation of the lead-screw by the motor into translation of carriage 24, sliding along rod 25. The end of the lead-screw away from the motor is journaled in bearing 31.

Projection lamp 33 is located below rollers 14 and 15 and is horizontally disposed to illuminate an area sufficient to fully illuminate a frame of the microfiche. The selected frame is always brought to this area by the heretofore mentioned three means to move the film.

Code means 34 embraces a series of light pipes or the equivalent that are spaced to individually illuminate a digital bit from the code along one edge of the film.

Figure 4:
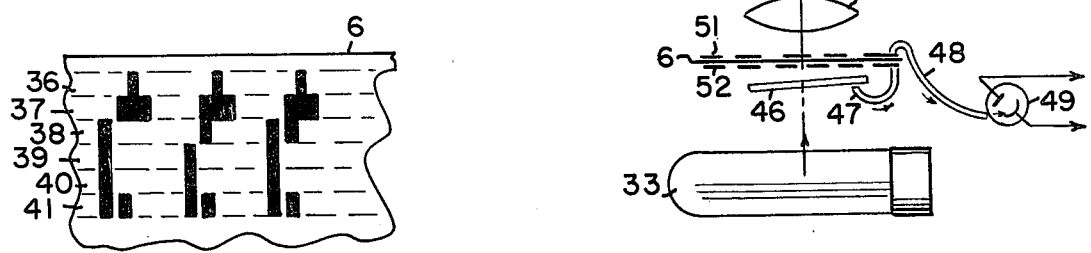
FIG. 4 shows the optical digital code along an edge of the film.

Typically, six digital bit paths are provided, as shown in FIG. 4. In that figure the top path 36 provides the logic with clock pulses originated by movement of film 6. An opaque and relatively narrow mark upon the film is centered with respect to each column of microfiche frames.

The next lower path 37 provides fiduciary information and is represented by a relatively wide and similarly centered opaque mark. This accomplishes centering each selected frame by means of plural sensors which "straddle" the mark when the logic control associated with the sensors has suitably controlled the means to move film 6.

The next lower path 38 is the units information of the digital number corresponding to the frame of the microfiche selected. This may have several opaque marks according to the digital format utilized, with a corresponding number of sensors to read the same.

Similarly, the next lower path 39 carries the tens digital information, the next path 40 the hundreds digital information, and the next path 41 the thousands digital information.

Of course, the code on the microfiche film may have the background of all of the paths opaque and the active marks transparent, rather than the reverse that has been set forth above. Also, a different disposition of the paths and the functional interpretation of the same may be arranged.

The transverse motion of film 6 is controlled by further photo-sensors 42, which plurality constitutes code means to energize the third means 12 to move the film transversely.

Coactive therewith is transparent tape 43. This has opaque digital and clock information relating to each microfiche frame in a column, as represented on the tape in FIG. 1. This information is aligned with plural sensors in the same manner as was discussed with respect to FIG. 4. Tape 43 is attached to the leftward extension of carriage 24 and is held taut by known means.

Figure 3:
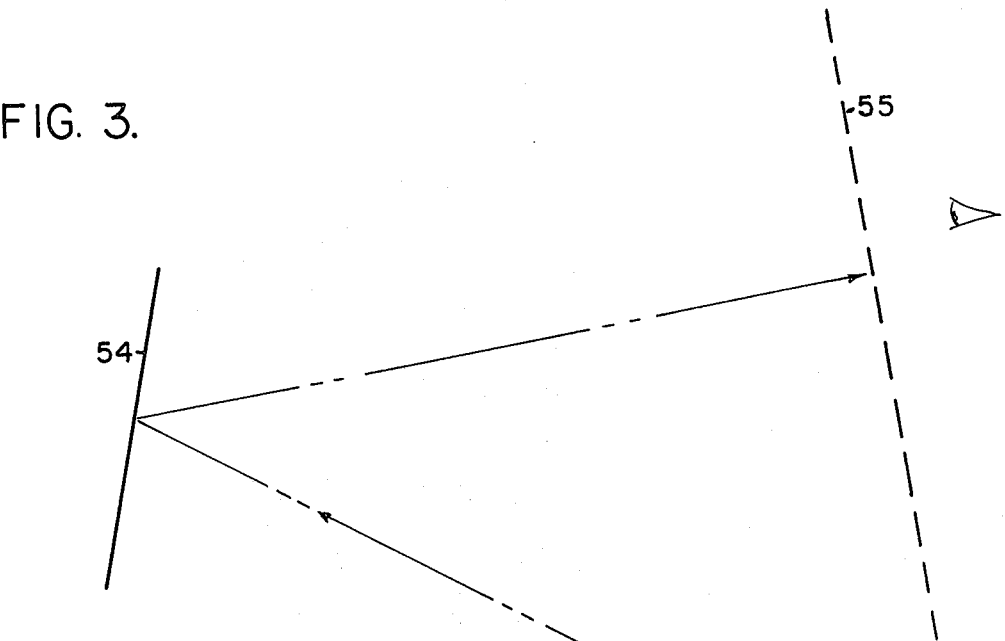
FIG. 3 is a schematic diagram of the optical system.

In the schematic representation of the optical system in FIG. 3, lamp 33 may be of the high entensity quartz halogen type. It is provided with known reflector and condenser elements, which have not been shown.

Prior to impinging upon film 6 the illumination of the optical path passes through light-frequency-selective means 46; typically a dichroic mirror that passes the shorter wavelengths of light and reflects the longer wavelengths, including the infra-red.

A portion of the reflected light is collected by first plural optical fiber means 47. This plurality is typically sixteen, to correspond to the six paths shown in FIG. 4; for clock, fiduciary, units, tens, hundreds and thousands. Only one fiber has been shown in FIG. 4, for simplicity and clarity.

The code markings are at the right edge of film 6 in FIG. 3. Directly above the film markings and aligned with the corresponding fibers of means 47 is second plural optical fiber means 48. These sixteen fibers lead to a corresponding number of photo-sensitive sensing means 49, only one of which has been shown for clarity. Thus, an electrical output is obtained corresponding to the opacity of the paths upon the film.

Selective light-frequency means 46 contributes to the efficiency of the whole device in that sensing means 49 are conveniently phototransistors or photo-diodes and these are sensitive to red and infra-red illumination. Film 6 is deleteriously affected by infra-red illumination, in that it tends to bulge when heated, as at least one factor, and this tends to move it out of focus. Thus, employing "cool" wavelengths of illumination for projecting the microfiche frame upon a viewing screen is an advantage.

In a simplified alternate arrangement, frequency selective means 46 may be omitted and optical fiber means 47 merely positioned to intercept light flux from source 33.

In any event, light flux from source 33 passes through film 6, illuminating a frame of microfiche. Various demagnification fiche formats may be reproduced according to this invention. A nominal value is 42X, with 24X and 48X available upon appropriate selection of the focal length of lens 50, with corresponding alteration of the spacing of the lens from the film and the size of the optical gate.

Lens 50 is preferably arranged to be "floating"; that is, it is supported from a top transparent plate that rests upon film 6; the plate being element 51. A sandwich including lower transparent plate 52 may be formed, which is closed when film 6 is stationary. In any event, lens 50 is supported a set distance from the film, despite other possible mechanical variations. A helical compression spring may be used to urge the lens down upon the upper plate, and focus means to vary the set distance may be provided.

A small mirror 53, such as 6 cm wide by 12 cm high, is disposed above the objective lens to reflect image-bearing light flux to the rear of an enclosing cabinet that has not been shown.

Here it impinges upon large mirror 54, which may be about 20 cm wide and 30 cm high. From thence it is reflected forward to rear projection viewing screen 55. This screen is preferably located at a slight slant to the vertical, and may have a size of 33 cm high by 30 cm wide.

Other projection systems may be used, including a flip-in mirror to expose sensitive paper for making a hard copy.

Figure 5:
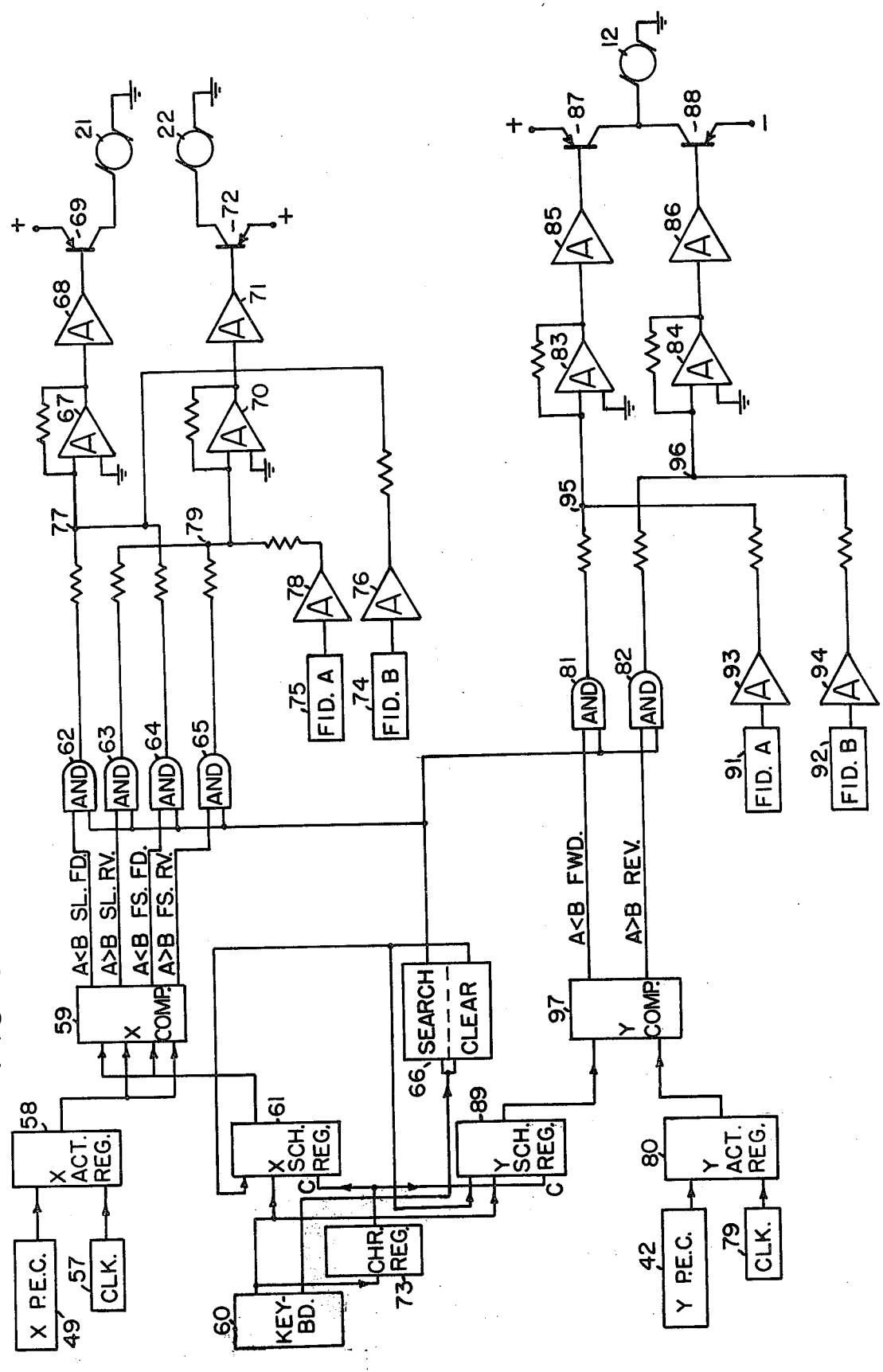
FIG. 5 shows a schematic electrical diagram of the logic and motor control electrical systems.

In the schematic electrical diagram of FIG. 5, element 49 represents the plural, as 16 photo-sensors shown in FIG. 3. These are the sensors coacting with the units, tens, hundreds and thousands paths, 38 through 41 of FIG. 4. Similarly, element 57 represents the photo-sensor associated with clock path 36.

By the connections indicated by the single line, these are inputs to the X axis active register 58. This register may be composed of four CD4042 integrated circuits (IC's).

The output of this register is connected to a pair of inputs on X axis comparator 59, which may be composed of four 4063 IC's.

Keyboard 60 is available for manually entering the known address of a particular individual microfiche frame. Film 6 may be as long as 30 meters in practice. Thus, there may be thousands of individual frames upon it, in hundreds of columns.

Keys from one through nine and zero are available on the keyboard, as well as reload, cancel, search, and power (on-off).

The numerical keys are interconnected with diodes and the decimal character of the keyboard is converted to binary coded decimal. This output enters X axis search register 61 by the conductor shown, which is actually composed of four wires to carry the digitally represented information.

The output of register 61 passes to another pair of inputs of X axis comparator 59. This allows this comparator to determine how different the actual position of film 6 is with respect to the selected position as punched in on keyboard 60.

Comparator 59 has four output connections. The first two give an output under the following conditions; the upper output, A<B, causes the motor 21 driving film 6 longitudinally to go slowly forward. This occurs when the film is approaching the code index that has been selected on the keyboard. The next lower output, A>B, causes a slow drive in reverse.

The lower two outputs repeat the prior two, but cause a fast forward for A<B, and a fast reverse for A>B. This mode of drive occurs when the film is greater than 100 addresses from the selected code index.

The forward and reverse capability is required to give desired indexing performance whenever an index is selected on the keyboard, no matter where film 6 may be as a result of the last such selection.

These four outputs enter one input of each of dual input AND gates 62, 63, 64, 65, the outputs of which go to control motors 21 and 22 for longitudinal drive of the film.

The other input to the AND gates is common and comes from the operation of the "search" push-button on the keyboard, with corresponding logic in element 66. When this button is pushed the AND gates are enabled and an output therefrom occurs corresponding to the inputs from register 59.

Assuming that the digital index of the actual position of the film in the X (longitudinal) direction is relatively different from the selected (desired) index entered into the keyboard; an output is then present from AND gate 64, fast forward. This further assumes that the difference is such as to go from a low digital number to a higher digital number.

If the opposite number situation is true, then there is no output from gate 64, but there is an output from gate 65.

In either event this output passes through a summing resistor and to the ungrounded input of operational amplifier 67. This amplifier may be half of a CA747AE.

The output thereof passes to power amplifier 68, which may include a 2N4403 transistor, and thence to power supply transistor 69, an MJ2501. This transistor is connected to a motor-energizing power supply of the order of plus 15 volts, and to forward drive motor 21;

see FIG. 1. This motor is then relatively fully energized and therefore rotates rapidly.

In a similar manner, when the actual (active) digital address is relatively close to the selected index, say within 100 addresses, an output is present from AND gate 62. This passes through another summing resistor, through amplifiers 67, 68, transistor 69, and acts to power motor 21. However, the output from gate 62 is less than the previous output amplitude from gate 64 and the motor operates slowly. This portion of the circuit is analog (proportional to input) and so such performance is possible.

When the desired index number is smaller than the index number of the actual position of film 6, then an output from AND gate 65 occurs when the difference in these numbers is large and from AND gate 63 when this is small.

The equivalent circuit and performance then involves amplifiers 70 and 71, transistor 72 and reverse direction motor 22.

In order that there will always be a counter-torque with respect to motors 21 and 22, the bias on transistors 69 and 72 is such that a small amplitude of current is always passed through to the corresponding motor. This keeps the film taut, since they are arranged to rotate in opposite directions.

When a firm command comes through from the logic at the left of FIG. 5, either the forward or the reverse motor is adequately energized and the residual torque on the other motor still keeps the film taut, but is not effective in preventing longitudinal traverse of the film.

Fine positioning of the film; i.e., accurate positioning at rest, from information from fiduciary path 37 is accomplished by sensors 74 and 75. These may be phototransistors. These "straddle" the particular fiduciary mark upon correct centering being accomplished. Until that is accomplished, an output from one, such as 74, and zero output from the other, such as 75, causes the appropriate motor 21 or 22 to turn slightly farther until the straddle condition is brought about.

The output of sensor 74 is amplified by known operational amplifier 76, and through a resistor is connected to summing junction 77 that is associated with forward amplifier 67. This urges the film minutely forward.

Correspondingly, the output of sensor 75 is amplified by known operational amplifier 78, and through a resistor is connected to summing junction 79 that is associated with reverse amplifier 70. This urges the film minutely backward.

The X axis digital address format includes the four paths 38 through 41, thus providing for the thousands of possible addresses on 30 meters of film 6.

On the Y axis there is typically only 14 addresses. Thus, only two paths are required.

Otherwise, the logic control for the Y axis motor 12 is essentially the same as has been described for the X axis motors.

Specifically, Y axis information is obtained from keyboard 60, and this enters Y axis search register 89, which may also be composed of two CD4042 IC's. The output of this register is connected to an input on Y axis comparator 97.

Character register 73 receives Y data and generates a clock output, which is fed to both the X and Y search registers 61 and 89.

Element 66 further implements the "Clear" pushbutton on the keyboard, with an output going to both X axis search register 61 and Y axis search register 89.

When actuated, this clears the registers, preparatory to manual entry of a new address.

Element 42 represents the plural, say two paths, or five photo-sensors for the Y axis, that are contained within element 42 in FIG. 1. These sensors are also energized through digital markings on tape 43 from plural light fibers that have not been shown.

A clock path in the same structure is sensed by another photo-sensor 79, shown in FIG. 5.

All of these outputs are inputs to Y axis active address register 80. The output thereof is the second input to Y axis comparator 97. This comparator may be composed of two CD4063 IC's.

Slow and fast search speeds are not required in the Y direction, since the distance to be traversed is relatively very small. Thus, A<B output gives a forward motion and A>B gives reverse motion. These outputs enter AND gates 81 and 82, respectively. The second input to each gate being the search command from element 66, as before.

Outputs therefrom pass through summing resistors and through operational amplifiers 83 or 84, power amplifiers 85 or 86, and power control transistors 87 or 88, for forward or reverse rotation of motor 12, respectively. This motor may be a permanent magnet type, in which excitation with one polarity of electricity gives forward rotation and with the reverse polarity gives reverse rotation.

Accordingly, transistor 87 is connected to a plus polarity voltage supply, as 15 volts, and transistor 88 is connected to a minus polarity voltage supply, as 15 volts. In this way opposite direction of rotation of motor 12 is obtained.

As with the X axis control system, for accurate positioning on the Y axis photo-sensors 91 and 92 straddle a particular fiduciary mark on tape 43 to give equal outputs at rest.

The outputs therefrom enter amplifiers 93 or 94, and through summing resistors to summing junctions 95 or 96, respectively, for moving the carriage incrementally forward or back.

An electrically produced numerical display of the frame code position of film 6 at any instant may be included in the device of this invention by employing known seven element numerical display means, such as of the SP333 type. This, through appropriate known drivers, is connected to the X axis active register 59 of FIG. 5.

An alternate embodiment of the means to illuminate the several paths of digital information, as paths 36 through 41, and tape 43, may be composed of individual light emitting sources, as light-emitting diodes.

Any number of unreleasingly attached cartridges 2 may be prepared with rolls of microfiche film and substitutionally employed with the rest of the reproducer of this invention.

We claim:

1. A microfiche reproducer for indexing a particular microfiche frame to a viewing position from amongst a plurality of microfiche, comprising:
    (a) a single roll of film (6), which film has code markings (38–41) adjacent to an edge that uniquely identify each microfiche frame as to column,
    (b) illumination means (33) to illuminate both said microfiche frame at said viewing position and individually said code markings pertaining thereto,
    (c) first means (21,16) to move said film forward,
    (d) second means (22, 3) to move said film backward, (e) third means (12) to move said film transversely, (f) sensing means (49) spatially related to said film and said viewing position to respond to illumination as modified by said code markings, (g) further sensing means (42) responsive to the transverse position of said film, (h) first code means (58) to form an electrical representation corresponding to said code markings that uniquely identify the particular said microfiche frame as to column, (i) second code means (80) to form an electrical representation corresponding to the transverse position of said film, and (j) electronic logic means (59–88) connected to both of said sensing means, to both of said code means, to said first and second means to thereby tautly move said film to the column of microfiche frames in which said particular microfiche frame lies, and to said third means to select the row of microfiche frames in which said particular microfiche frame lies, by comparing the outputs of both of said sensing means and said code means.

2. The reproducer of claim 1, in which;

(a) said first means to move (21) includes a permanently attached reel (16–18) to selectively wind and unwind said roll of film (6), (b) said second means to move (22) includes, a removable rectilinear-shaped cartridge (2) that unreleasingly carries said film (6), & spindle means (3) to couple said means to move (22) to said film (6) within said cartridge to selectively unwind and wind said roll of film (6), , and (c) an element (72) of said logic means to selectively partially energize said second means to move (22) when said first means to move (21) is driving said film (6), to maintain said film taut.

3. The reproducer of claim 1, in which;

(a) said roll of film includes hook engaging means (11) at the initial end thereof, and (b) said first means includes strap means (13) having a rivet to engage said engaging means for reeling said film upon said first means.

4. The reproducer of claim 3, which additionally includes;

(a) a moveable scythe member (32), disposed below said strap means (13), and (b) a flexible tongue (35) above and coactive with said scythe member to connect said engaging means (11) and said strap means (13) by motion of said scythe member.

5. The reproducer of claim 1, in which said illumination means comprises;

(a) a polychromatic source of illumination (33), (b) light-frequency-selective means (46) disposed in the path of said illumination, (c) screen means (55), (d) a first optical path (6, 50, 53, 54) from said frequency-selective means to sid screen means, disposed to convey the higher light-frequencies thereto, and (e) a second optical path (47,48) from said frequency-selective means to said code markings disposed to convey the lower light-frequencies thereto.

6. The reproducer of claim 5, in which;

(a) said light-frequency-selective means is a dichroic mirror (46).

7. The reproducer of claim 5 in which said second optical path is comprised of;

(a) first plural optical fiber means (47) disposed on the source of illumination side of said light-frequency-selective means, and extending to said code markings, and (b) second plural optical fiber means (48) extending from said code markings to said code means (49).

8. The reproducer of claim 1, in which said logic means comprises;

(a) search register means (61) loadable to contain the digital code off a particular said microfiche frame, (b) active register means (58) loadable with the code of the microfiche frame disposed as said sensing means at any instant of time.

(c) comparator means (59) connected to said search register means and said active register means to give an output related to the digital difference between said search and said active register means, and (d) means to control (62–79) said first (21) and second (22) means to move said film connected thereto and to said comparator means, thereby to move said film according to said output from said comparator means.

9. The reproducer of claim 11, which additionally includes;

(a) a second logic system comprising search (89) and active (80) register means, digital comparator means (97), and means to control (81–96) said third means (12), whereby said film (6) is moved transversely to the selected microfiche frame in a column of frames.

* * * * *